United States Patent [19]
Feng

[11] Patent Number: 5,235,865
[45] Date of Patent: Aug. 17, 1993

[54] TRANSMISSION MECHANISM FOR MUSIC BOX ORNAMENT

[76] Inventor: Grace Feng, 8 Fl., No. 222, Fu Hsing N. Rd., Taipei, Taiwan

[21] Appl. No.: 926,401

[22] Filed: Aug. 10, 1992

[51] Int. Cl.⁵ ............................................. F16H 37/14
[52] U.S. Cl. ......................................... 74/86; 40/414; 446/358
[58] Field of Search ................... 74/86, 22 R, 63, 68; 446/297, 358, 359; 40/411, 414, 415; 472/6

[56] References Cited

U.S. PATENT DOCUMENTS

| | | | |
|---|---|---|---|
| 3,937 | 3/1845 | Zeigler | 74/86 X |
| 2,830,459 | 4/1958 | Yetter | 74/86 |
| 2,889,148 | 6/1959 | Lyles | 74/86 |
| 3,224,737 | 12/1965 | Becker | 74/86 |
| 3,857,479 | 12/1974 | Brems | 74/86 X |

FOREIGN PATENT DOCUMENTS 808238 2/1937 France ..................................... 472/6

*Primary Examiner*—Allan D. Herrmann
*Assistant Examiner*—William O. Trousdell
*Attorney, Agent, or Firm*—Michael D. Bednarek

[57] ABSTRACT

A mechanism is used for transmitting the power output of a power drive source such as a wind-up music to an ornament supported thereon. The transmission mechanism has a first drive wheel mounted on a power output shaft of the power drive source at one end of the power output shaft. A drive gear is mounted on the power output shaft of the power drive source at the other end of the power output shaft. A second frame is fixed to the first frame sopporting the power drive source. An idler gear is supported on the second frame by a first shaft and meshed with the drive gear. An output gear is supported on the second frame at the far side of the drive gear and meshed with the idler gear. A second drive wheel is supported on the second frame and securely connected to the output gear through a second shaft. A support plate having a hole formed thereon is pivoted to the first drive wheel at one end and the second drive wheel at the other end. A tappet rod is securely mounted on the support plate through the hole and provided with the ornament therewith. When the first drive wheel and the second drive wheel are driven by the power drive source to subsequently make the support plate to move in a circular motion, the ornament will be imparted a circular motion also.

5 Claims, 2 Drawing Sheets

TRANSMISSION MECHANISM FOR MUSIC BOX ORNAMENT

BACKGROUND OF THE INVENTION

1. Field of the Invention

The present invention relates to a transmission mechanism for a music box ornament, more particularly to a mechanism for transmitting the power output from a drive source to an ornament for imparting a circular movement to the ornament.

2. Description of the Prior Art

It is well known to provide a conventional music box with an animated device which is supported for movement imparted by the power output of a power drive source in the music box. The ornament is moved to impart a sense of realism consistent with the nature of the ornament. In order to realize such a movement, the power output of the music box must be transmitted to the ornament by an appropriate mechanism.

U.S. Pat. No. 4,939,944 discloses a mechanism for transmitting the power output of a music box to an ornament supported thereon, wherein the output shaft of the music box rotate an eccentric stub that is engaged within a slide link supported for vertical movement on a pair of guide rods. The ornament is supported by a tappet rod having lower end secured to either the slide link or the drive stub, so that operation of the music box will impart the desired movement to the ornament.

In the first embodiment of U.S. Pat. No. 4,939,944, the tappet rod is secured to the slide link to impart rectilinear reciprocating movement to the ornament. In the second embodiment of U.S. Pat. No. 4,939,944, the tappet rod is secured to the drive stub and journalled through the casing by a ball joint assembly, thereby simultaneously imparting both vertical and rocking movements to the ornament.

In such an invention, the mechanism for moving an ornament in above-mentioned motion are still complicated in construction and hence costly to manufacture.

SUMMARY OF THE INVENTION

It is an object of the present invention to provided an transmission mechanism for a power driven ornament.

It is another object of the present invention to provide a transmission mechanism which is capable of imparting an orbiting movement to an ornament of a music box.

It is a further object of the present invention to provide a music box with a transmission mechanism wherein the mechanism is rather simple in construction and economical to manufacture.

The above objects may be realized by a transmission mechanism of the present invention. The mechanism of the present invention includes some form of gearing arrangement and associated moveable parallel-crank support plate. The mechanism is used for transmitting the power output of a power drive source supported on a first frame to an ornament for imparting desired movement thereto. The mechanism of the present invention comprises a first drive wheel mounted on a power output shaft of the power drive source at one end of the power output shaft; a drive gear mounted on the power output shaft of the power drive source at the other end of the power output shaft; a second frame secured to the first frame; an idler gear, which is supported on the second frame and meshed with the drive gear; an output gear having an identical configuration with the drive gear, which is supported on the second frame at the far side of the drive gear and meshed with the idler gear; a second drive wheel, which is supported on the second frame and securely connected to the output gear; a support plate having a hole formed thereon, which is pivoted at a distance 'R' to the center of first drive wheel at one end and also at a distance 'R' to the center of the second drive wheel 13 at the other end; and a tappet rod, which is securely mounted on the support plate through the hole formed on the support plate and provided with the ornament therewith whereby, when the first drive wheel and the second drive wheel are driven by the power drive source to subsequently make the support plate to move in a circular motion, an orbiting movement of the ornament is obtained.

Other objects, feature and advantages of the invention shall become apparent from the following detailed description of preferred embodiments thereof, when taken in conjunction with the drawings wherein like referenced characters refer to corresponding parts in the several views.

DETAILED DESCRIPTION OF THE PREFERRED EMBODIMENTS

Figure 1:
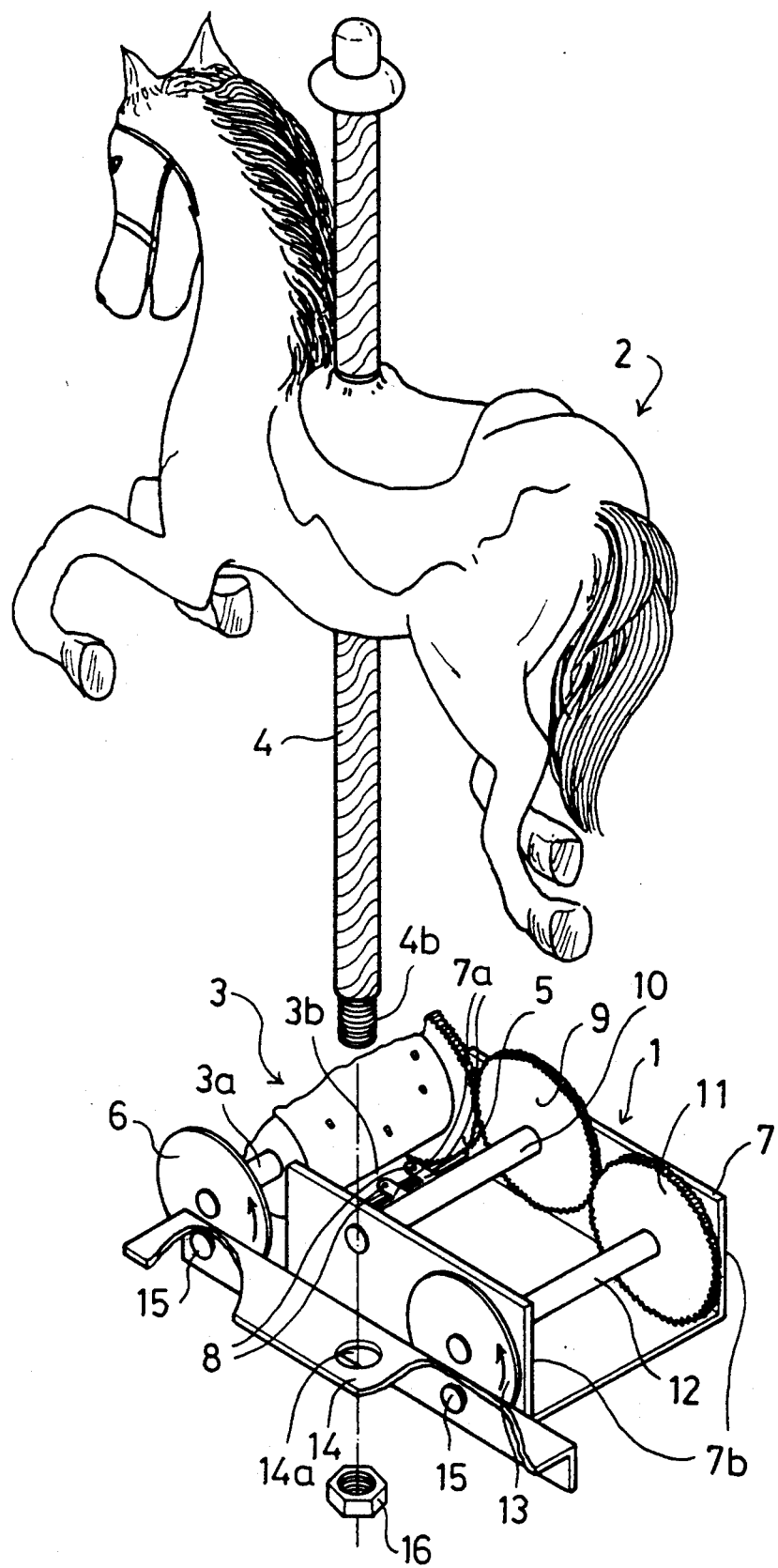
FIG. 1 is a perspective view showing a transmission mechanism in accordance with the present invention for transmitting the power output of a wind-up music box to an ornament.

A transmission mechanism 1 according to the present invention will be described with initial reference with FIG. 1 which clearly illustrates how the transmission mechanism 1 associates an ornament 2 in for of a horse with a power drive source 3, such as a conventional wind-up music box, which is supported on a first frame 3b of the music box. The power drive source 3 and the transmission mechanism 1 are normally enclosed in a decorative casing (not shown) having a hole on the top of the casing to let a tappet rod 4 to protrude therethrough.

With reference to FIG. 1 first, a drive gear 5 is keyed to a power output shaft 3a of a power drive source 3 such as a wind-up music box at the rear end thereof. A first drive wheel 6 is keyed to the power output shaft 3a of the power drive source 3 at the front end thereof.

Figure 2:
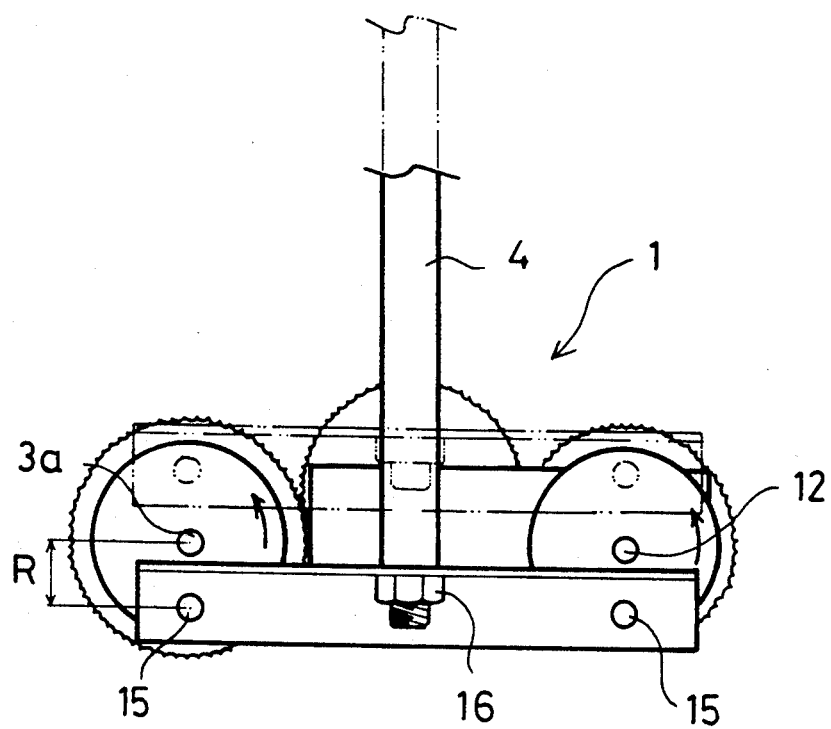
FIG. 2 is an elevational view of the transmission mechanism according to the present invention.

A second frame 7 of U-shaped configuration provided with two lugs 7a thereof is fixed to the first frame by way of two rivets 8. An idler gear 9 is keyed to a first shaft 10 which is rotatably supported on the upright wall 7b of the second frame 7 and meshed with the drive gear 5. A output gear 11 has an identical configuration with the drive gear 5. The output gear 11 is keyed to a second shaft 12 which is rotatably supported on the upright walls 7b of the second frame 7. The output gear 11 is disposed at the far side of the drive gear 5 and meshed with the idler gear 9 such that the power output shaft 3a of the power drive source 3, the first shaft 10 of the idler gear 9 and the second shaft 12 of the output gear 11 are substantially coplanar. A second drive wheel 13 is supported in a cantilever manner and keyed to the second shaft 12. A support plate 14 have a hole 14a thereon is mounted by pins 15 to the first drive wheel 6 and the second drive wheel 13. The pins 15 are positioned from the centers of the power output shaft 3a and the second shaft 12 at a distance 'R' as best shown in FIG. 2. The tappet rod 4 is integrally formed with a threaded stem 4b at the lower end thereof. The outside diameter of the threaded stem 4b is smaller than the hole 14a such that the tappet rod 4 is capable of being secured to the support plate 14 by way of a nut 16.

The operation of the mechanism 1 is clearly apparent from FIGS. 1 and 2. When the power drive source 3 is activated, the drive gear 5 and first drive wheel 6 will rotate in counterclockwise direction. The output gear 11 and the second drive wheel 13 are simultaneously drive by the power drive source 3 through the drive gear 5 and the idler gear 9 such that the first drive wheel 6 and the second drive wheel 13 are rotated in the same angular velocity. The first drive wheel 6 and the second drive wheel 13 act like a crack so as to make the support plate 14 move in a circular manner whereby the ornament 2 in the configuration of a horse appears to be galloping when movement is imparted by the transmission mechanism 1.

Although a wind-up music box may be used as a power drive source, it is understood the other well known drive sources, such as electric motors, may also be used to perform the required function as described herein.

Although the present invention has been described in its preferred form with a certain degree of specificity, it is understood that the present disclosure of the preferred form has been changed in the details of construction, and recombination and arrangement of parts may be resorted to without departing from the spirit and the scope of the present invention as hereinafter claimed.

What is claimed is:

1. A mechanism for transmitting the power output of a power drive source supported on a first frame to an ornament for imparting desired movement thereto, which comprises:
   (a) a first drive wheel mounted on a power output shaft of the power drive source at one end of the power output shaft;
   (b) a drive gear mounted on the power output shaft of the power drive source at the other end of the power output shaft;
   (c) a second frame fixed to the first frame;
   (d) an idler gear, which is supported on the second frame and meshed with the drive gear;
   (e) an output gear having an identical configuration with the drive gear, which is supported on the second frame at a side of the second frame away from the drive gear and meshed with the idler gear;
   (f) a second drive wheel, which is supported on the second frame and securely connected to the output gear;
   (g) a support plate having a hole formed thereon, which is pivoted at a distance 'R' to the center of the first drive wheel at one end and also at a distance 'R' to the center of the second drive wheel at the other end; and
   (h) a tappet rod, which is securely mounted on the support plate through the hole formed on the support plate and provided with the ornament therewith whereby, when the first drive wheel and the second drive wheel are driven by the power drive source to subsequently make the support plate to move in a circular motion, an orbiting movement of the ornament is obtained.

2. A transmitting mechanism as claimed in claim 1, wherein the second frame is formed as a U-shaped configuration.

3. A transmitting mechanism as claimed in claim 2, wherein the idler gear and the output gear are supported by a first shaft and a second shaft respectively on two upright walls of the U-shaped second frame.

4. A transmission mechanism as claimed in claim 3, wherein the second drive wheel is supported by the second shaft in a cantilever manner.

5. A transmission mechanism as claimed in claim 1, wherein the tappet rod is provided with a threaded stem having an outside diameter smaller than the hole of the support plate whereby the tappet rod is capable of being bolted to the support plate by way of the threaded stem.

* * * * *